United States Patent [19]

Nakazima

[11] Patent Number: 5,130,973
[45] Date of Patent: Jul. 14, 1992

[54] DISK PLAYER LOCKING MECHANISM WHOSE ACTUATOR IS ENERGIZED ONLY DURING UNLOCKING OPERATION

[75] Inventor: Tohru Nakazima, Saitama, Japan

[73] Assignee: Pioneer Electronic Corporation, Tokyo, Japan

[21] Appl. No.: 262,860

[22] Filed: Oct. 26, 1988

[30] Foreign Application Priority Data

Apr. 20, 1988 [JP] Japan .................. 63-97940

[51] Int. Cl.⁵ .......................................... G11B 17/30
[52] U.S. Cl. .................................. 369/219; 369/215;
369/230; 369/244; 369/257
[58] Field of Search .................. 369/50, 53, 79, 212,
369/215, 219, 221, 226, 230, 233, 243, 244, 253,
257; 360/105

[56] References Cited

U.S. PATENT DOCUMENTS

| | | | |
|---|---|---|---|
| 2,998,255 | 8/1961 | Pfundt | 369/257 |
| 3,915,458 | 10/1975 | McDonald | 369/257 |
| 3,940,148 | 2/1976 | Torrington et al. | 369/79 |
| 4,032,971 | 6/1977 | Camerik | 369/79 X |
| 4,092,671 | 5/1978 | Camerik | 369/79 |
| 4,342,108 | 7/1982 | Kitamura et al. | 369/221 |
| 4,412,320 | 10/1983 | Yamakawa | 369/79 |
| 4,435,800 | 3/1984 | Dennis et al. | 369/257 X |
| 4,516,233 | 5/1985 | Kirschner | 369/79 |
| 4,574,372 | 3/1986 | d'Alayer de Costemore d'Arc | 369/244 |
| 4,654,735 | 3/1987 | Izraelev et al. | 360/105 X |
| 4,725,907 | 2/1988 | Jue | 360/105 |
| 4,742,410 | 5/1988 | Smith | 360/105 |
| 4,786,995 | 11/1988 | Stupeck et al. | 360/105 X |
| 4,899,328 | 2/1990 | Ishii et al. | 369/257 X |

Primary Examiner—Benjamin R. Fuller
Assistant Examiner—Randy W. Gibson
Attorney, Agent, or Firm—Sughrue, Mion, Zinn, Macpeak & Seas

[57] ABSTRACT

A disk player including a pickup unit having a locking pin, and a locking mechanism which engages with the locking pin. The locking mechanism comprises a locking means for engaging and holding the locking pin when an actuator is de-energized, and an unlocking means which is actuated in conjunction with the application of power so that the disk player will be in playback mode. The unlocking means cooperates with the locking means when the locking pin is engaged by the locking means. The actuator is energized for an appropriate time after the application of power to the disk player so as to unlock the pickup unit, thus reducing the consumption of power and the generation of heat in the disk player.

24 Claims, 3 Drawing Sheets

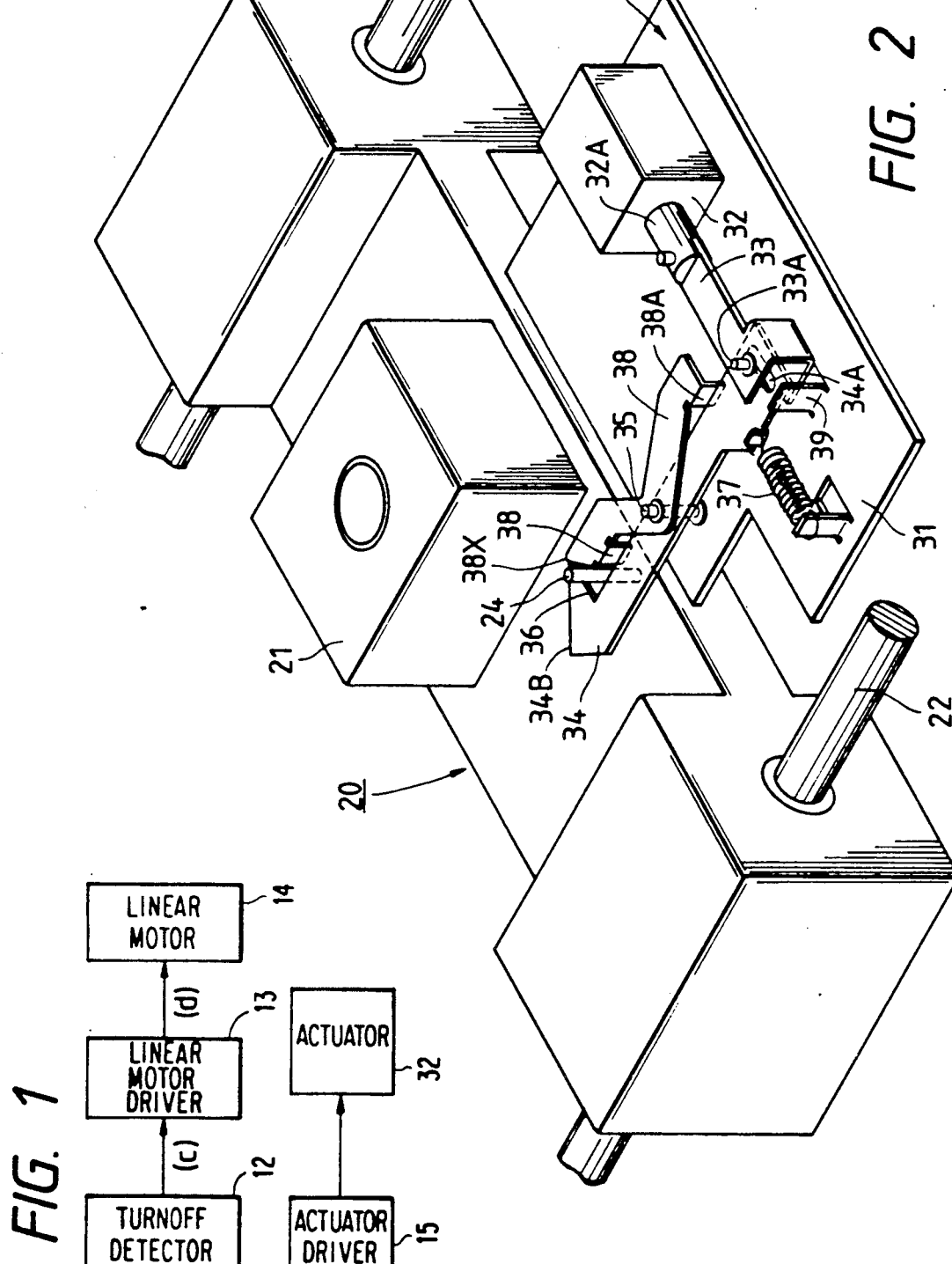

DISK PLAYER LOCKING MECHANISM WHOSE ACTUATOR IS ENERGIZED ONLY DURING UNLOCKING OPERATION

BACKGROUND OF THE INVENTION

1. Field of the Invention

The present invention relates to a disk player, and more particularly to a disk player including a pickup unit which is moved by a linear motor.

2. Description of the Prior Art

In a conventional disk player, the pickup unit is moved in the radial direction of a disk by a linear motor. The disk player is provided with a mechanism for locking the pickup unit in the non-playback state such as the transportation of the disk player, to prevent unexpected movement which can result in collisions with the motor yoke or the like. Such collisions can result in damage to the pickup unit. Such a disk player is disclosed in the Japanese Utility Model Application (OPI) No. 80562/85 (the term "OPI" as used herein means an "unexamined published application"). In the locking mechanism, a tooth provided on the pickup unit is engaged with a rack which is turned toward or away from the pickup unit by an actuator. During disk playback, the actuator must be continually energized in order to maintain the unlocked state of the locking mechanism. As a result, the consumption of electric power and the rise in temperature within the disk player are high.

In order for the locking mechanism to be capable of functioning over the entire range of linear movement of the pickup unit, it is necessary for the length of the rack to be large, particularly for a disk of 30 cm in diameter. This in turn results in an increase in the driving force of the actuator, thus further increasing the consumption of power and the rise in temperature in the disk player.

SUMMARY OF THE INVENTION

The present invention was made in order to solve the above-mentioned problems of the conventional disk player.

Accordingly, it is an object of the present invention to provide a disk player in which an actuator for driving a locking mechanism is only energized during an unlocking operation, so as to reduce the consumption of power and the generation of heat in the disk player.

The disk player includes a pickup unit having a locking pin, and the locking mechanism which engages with the locking pin. The locking mechanism comprises a locking means for engaging and holding the locking pin when the actuator is de-energized, and an unlocking means which is actuated in conjunction with the application of power so that the disk player will be in playback mode. The unlocking means cooperates with the locking means when the locking pin is engaged by the locking means. The pickup unit is locked by the locking means, and unlocked by the unlocking means. The actuator is energized for an appropriate time after the application of power to the disk player so as to unlock the pickup unit. Since the period of time that the actuator is energized is very short, the consumption of power and the generation of heat in the disk player are reduced.

BRIEF DESCRIPTION OF THE DRAWINGS

FIG. 1 shows a block diagram of the control system of a disk player according to an embodiment of the present invention.

FIG. 2 shows a perspective view of the locking mechanism of the disk player.

DETAILED DESCRIPTION OF THE PREFERRED EMBODIMENT

Figure 3:
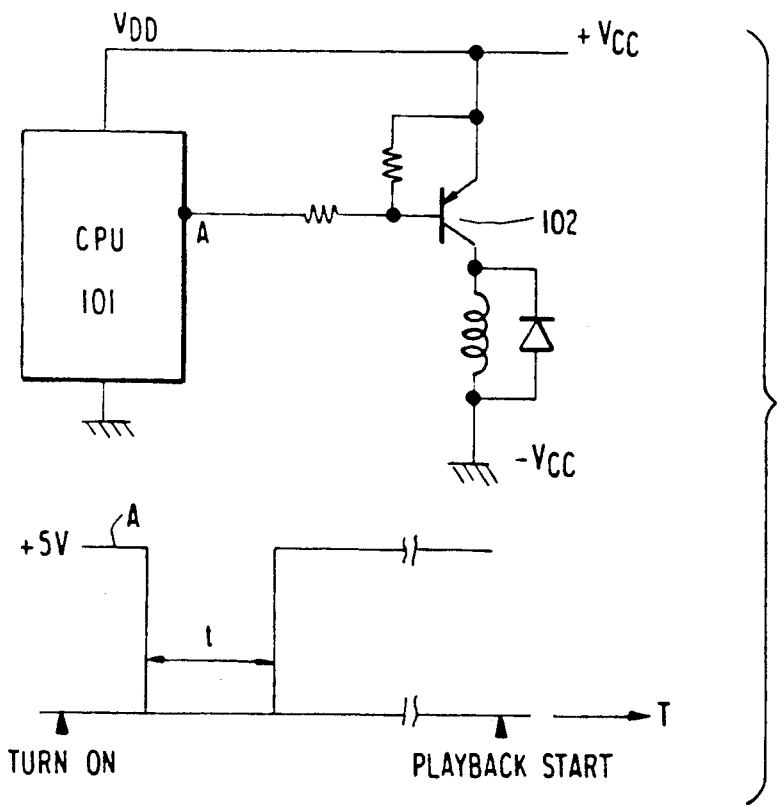
FIG. 3 shows an example of the actuator drive circuit of the disk player and a timing chart of the output thereof.

An embodiment of the present invention is hereafter described in detail with reference to the drawings attached hereto.

FIGS. 1-6 show a disk player according to the preferred embodiment. In FIG. 1, an output (b) of a power supply circuit 11 is supplied to a power supply turn-off detection circuit 12. which in turn outputs a timing signal (c) corresponding to this turning-off of power supply 11. The timing signal (c) is supplied to a linear motor drive circuit 13. The output (d) from the linear motor drive circuit 13 drives a linear motor 14 so as to move the pickup unit 20 (shown in FIG. 2) of the disk player in the radial direction of a disk to lock a locking pin 24 with an engaging means. The power supply circuit 11 also supplies an output (a) to an actuator drive circuit 15, which in turn energizes an actuator 32.

FIG. 2 shows the pickup unit 20 and pickup 21. Guide shafts 22 and 23 extend through both the end portions of the pickup unit 20. The pickup unit 20 is moved by the linear motor 14 (not shown in FIG. 2) along the guide shafts 22 and 23 in the radial direction of the disk. A locking mechanism 30 is provided at the end of the movement passage of the pickup unit 20. In the locking mechanism 30, the actuator 32 is mounted on a base 31, and an actuator rod 32A is oriented perpendicularly to the guide shafts 22 and 23 and is coupled at the tip of the rod to a link 33. The end of a locking lever 34 is coupled to the link 33 by a pin 33A which is disposed in the slender hole 34A of the locking lever 34. Normally, the locking lever 34 extends perpendicularly to the link 33. The locking lever 34 is pivotally coupled to the base 31 by a shaft 35 located approximately at the central portion of the locking lever 34. The locking lever 34 is provided with an oblique surface cam 34B at the other end of the lever and with a hook 36 next to the oblique surface cam. The locking pin 24 projecting from the pickup unit 20 can be engaged with the hook 36. The locking lever 34 is biased to rotate about the shaft 35 by a tension spring 37. The tension spring 37 is connected to the locking lever 34 between the shaft 35 and the pin 33A and at its opposite end to a portion of the base 31 which projects up from the base 31, so that the lever is urged clockwise about the shaft 35. The shaft 35 is fitted with an unlocking lever 38 which overlaps the locking lever 34, and is provided with kickers 38A and 38B extending at a side edge of the unlocking lever and facing the side edge of the locking lever 34 across small gaps. A stopper 39 is provided on the base 31 to stop the clockwise rotation of the locking lever 34.

FIG. 3 shows an example of the actuator drive circuit 15. In the example, after the application of power to the disk player, an actuator drive transistor 102 is turned on by an output A from a central processing unit 101 for t seconds so that the actuator is energized.

Figure 4:
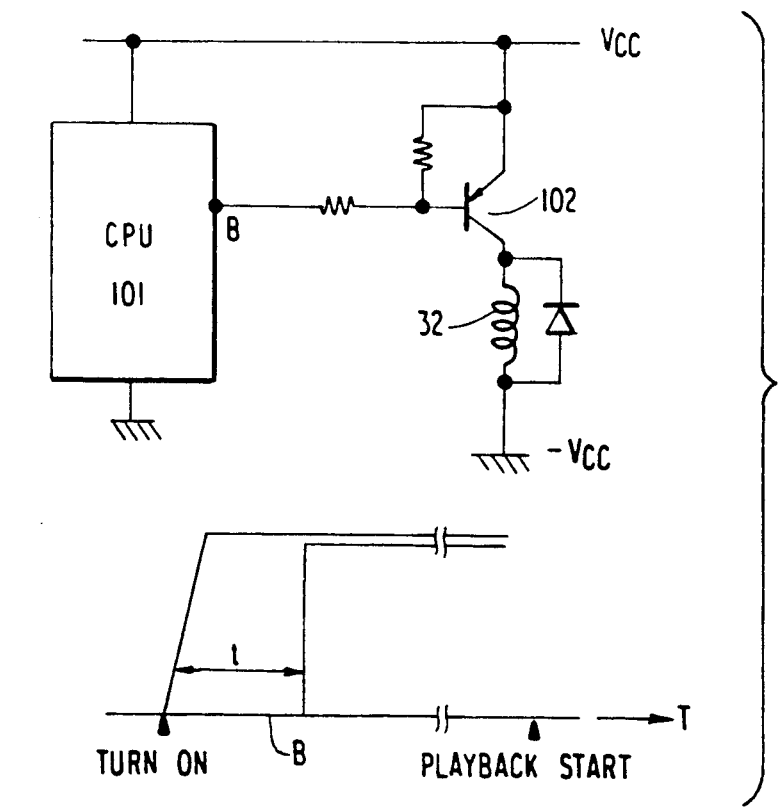
FIG. 4 shows another example of the actuator drive circuit and a timing chart of the output thereof.

FIG. 4 shows another example of the actuator drive circuit 15. In this example, after the application of power to the disk player, an actuator drive transistor 102 is turned on by a resetting signal B from a central processing unit 101 for t seconds so that the actuator 32 is energized.

Figure 5:
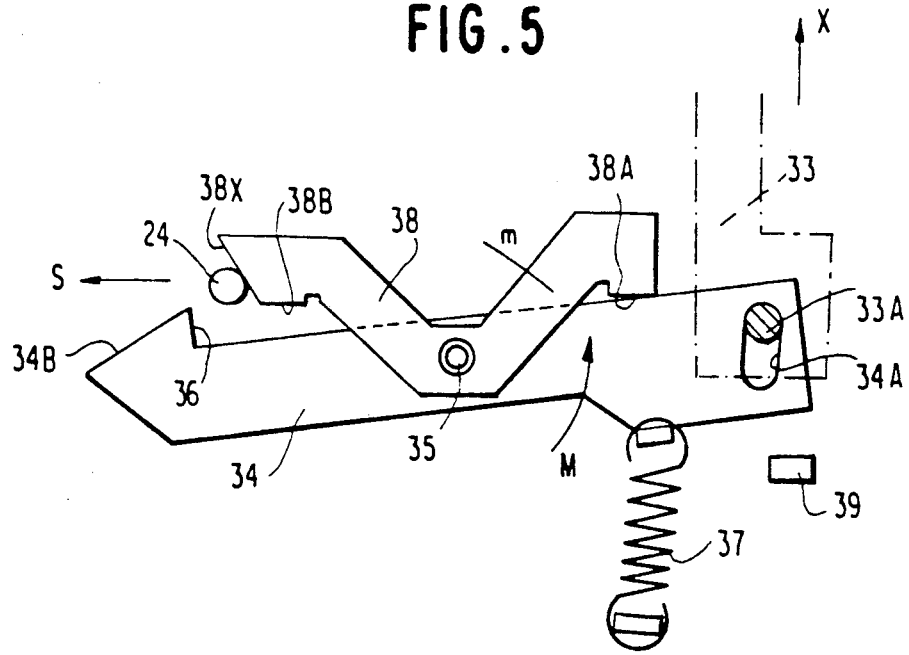
FIG. 5 shows a plan view of the locking mechanism when the the pickup unit of the disk player is in the unlocked state.

When the actuator 32 is energized, the link 33 is pulled to the end of the slender hole 34A of the locking lever 34 in a direction X as shown in FIG. 5. As a result the locking lever 84 is rotated counterclockwise about the shaft 35 against the force of the tension spring 37 as shown by an arrow M. This rotation causes the locking lever 34 to push the kicker 38A of the unlocking lever 38 so that the unlocking lever is turned counterclockwise about the shaft 35 as shown by an arrow m. The counterclockwise rotation of the locking lever 34 causes the hook 36 to disengage with and free the locking pin 24. The counterclockwise rotation of the unlocking lever 38 causes the locking pin 24 to be pushed out in a direction S by a surface cam 38X provided on the end portion of the unlocking lever 38. The pickup unit 20 is thus unlocked. After the pickup unit 20 is unlocked, the actuator 32 is de-energized so that the locking lever 34 is rotated back clockwise by the tension spring 37 and pushes the kicker 38B of the unlocking lever 38 so that the unlocking lever is likewise rotated back clockwise. The levers 34 and 38 are thus brought to the state shown in FIG. 6.

Figure 6:
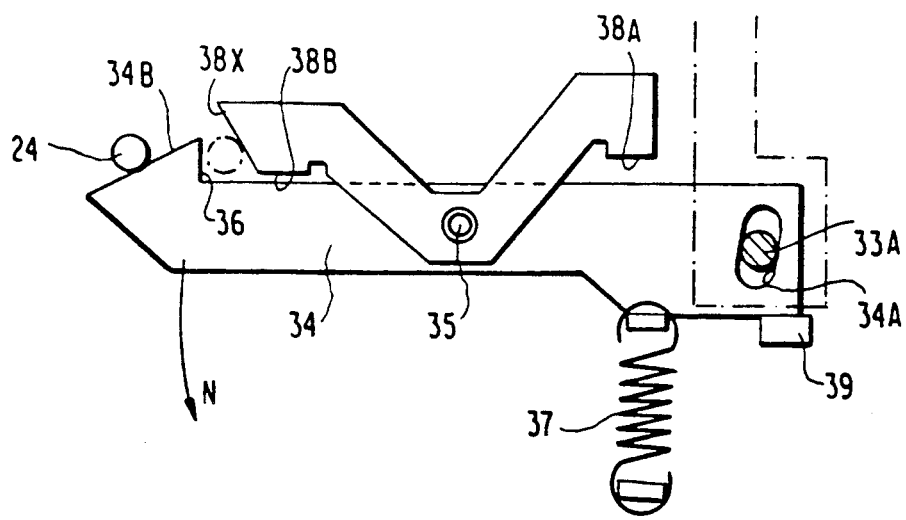
FIG. 6 shows a plan view of the locking mechanism when the pickup unit is in the locked state.

When the pickup unit 20 is to be locked again. the locking pin 24 is moved along the oblique surface cam 34B of the locking lever 34 so that the locking lever is turned counterclockwise by the product of the length of the oblique surface cam and the cosine of the angle of the oblique surface cam to the longitudinal direction of the locking lever, as shown by an arrow N in FIG. 6. As a result, the locking pin 24 is guided to the hook 36 so that the locking pin is held between the hook 36 and the surface cam 38A of the unlocking lever 38. The pickup unit 20 is thus locked again. In this case, the slender hole 34A makes it possible to turn the locking lever 34 by the product of the length of the oblique surface cam 34B of the lever and the cosine of the angle of the cam to the longitudinal direction of the lever, as shown by the arrow N.

The entire locking mechanism could of course be arranged so that positions of the locking lever 34 and the unlocking lever 38 are reversed and the actuator is disposed so that the actuator rod 32A extends in a direction 180° from the direction shown in FIG. 2. opposite direction

What is claimed is:

1. A disk player having a pickup which is driven by a linear motor, comprising:
    a pickup unit having said pickup disposed thereon and a locking pin; and
    a locking mechanism which engages said pin and includes:
    an actuator,
    a locking means for engaging said pin when said actuator is de-energized, and
    an unlocking means which is actuated in conjunction with application of power to said desk player for placing said player in playback mode, said unlocking means cooperating with said locking means to hold said pin in engagement with said locking means when said actuator is de-energized and having urging means for urging said locking pin, and attendantly said pickup unit, into an unlock position upon the application of power.

2. A disk player as recited in claim 1, wherein said actuator is energized for a relatively short period of time after power is applied to said disk player so as to unlock the pickup unit.

3. A disk player as recited in claim 1, wherein said locking mechanism is disposed at an end of a passage in which said pickup is moved.

4. A disk player as recited in claim 3, wherein said locking means comprises a locking lever which extends parallel to a direction of movement of said pickup unit when said pickup unit is in a locked state.

5. A disk player as recited in claim 4, wherein said unlocking means comprises an unlocking lever.

6. A disk player as recited in claim 5, wherein said locking mechanism further comprises a base having said actuator. said locking means and said unlocking means mounted thereon.

7. A disk player as recited in claim 6, wherein said locking lever and said unlocking lever are pivotally mounted on said base about a pivot shaft.

8. A disk player having a pickup which is driven by a linear motor, comprising:
    a pickup unit having said pickup disposed thereon and a locking pin; and
    a locking mechanism which engages said pin and includes:
    an actuator;
    a locking means for engaging said pin when said actuator is de-energized; and
    an unlocking means which is actuated in conjunction with application of power to said disk player for placing said player in playback mode, said unlocking means cooperating with said locking means to hold said pin in engagement with said locking means when said actuator is de-energized;
    wherein said locking mechanism is disposed at an end of a passage in which said pickup is moved;
    said locking means comprises a locking lever which extends parallel to a direction of movement of said pickup unit when said pickup unit is in a locked state;
    said unlocking means comprises an unlocking lever;
    said locking mechanism further comprises a base having said actuator, said locking means and said unlocking means mounted thereon;
    said locking lever and said unlocking lever are pivotally mounted on said base about a pivot shaft; and
    wherein said locking lever and said unlocking lever are pivotally mounted on said shaft at substantially the center of each said locking lever and said unlocking lever.

9. A disk player as recited in claim 8, wherein said actuator has an actuator rod extending therefrom, and said actuator is mounted on said base so that said actuator rod is oriented perpendicular to a direction of movement of said pickup unit.

10. A disk player as recited in claim 9, wherein a first end of said locking lever is coupled to said actuator rod.

11. A disk player as recited in claim 10, wherein a first end of said locking lever and said actuator rod are coupled by a pin and a link having a slit extending parallel to said actuator rod.

12. A disk player as recited in claim 10, wherein said locking lever is biased to rotate in a first direction about said shaft by a tension spring.

13. A disk player as recited in claim 12, wherein said locking lever has a hook disposed at a second end of said locking lever opposite said first end for engaging said locking pin, and an outer edge of said hook at said second end is an oblique surface cam, said locking pin moving along said oblique surface cam when said pickup unit is to be locked, causing said locking lever to rotate in a direction opposite said first direction.

14. A disk player as recited in claim 13, wherein said unlocking lever has a a first and second kicker plate disposed perpendicularly at a first and second end ends of said unlocking lever, respectively, said kicker plates extending disposed so as to face a side edge of said locking lever.

15. A disk player as recited in claim 14, wherein said locking lever is rotated in a direction opposite said first direction when said actuator is energized causing said hook to disengage said locking pin, said rotation of said locking lever opposite to said first direction causing said edge of said locking lever to engage said first kicker plate of said unlocking lever rotating said unlocking lever in said direction opposite said first direction.

16. A disk player as recited in claim 15, wherein said second end of said unlocking lever has a surface cam disposed thereon so that said pin is pushed away from said locking mechanism in said direction of movement of said pickup unit, said actuator de-energizing when said pickup unit is thus unlocked.

17. A disk player as recited in claim 16, wherein said locking pin is held between said hook and said surface cam disposed on said second end on said unlocking lever when said pickup unit is locked.

18. A disk player as recited in claim 13, wherein said, locking lever is rotated about said shaft a distance equal to product of a length of said oblique surface cam and a cosine of an angle of said oblique surface cam to a longitudinal direction of said locking lever.

19. A disk player as recited in claim 1, wherein said locking mechanism further comprises an actuator drive circuit including a transistor and a processing unit.

20. A disk player as recited in claim 19, wherein said transistor is turned on for a predetermined period of time by an output from said processing unit.

21. A disk player as recited in claim 1, wherein said locking means comprises a first member pivotable about an axis by said actuator and said unlocking means comprises a second member pivotable about said axis by said locking means.

22. A disk player having a pickup which is driven by a linear motor, comprising:
   a pickup unit having said pickup disposed thereon and a locking pin; and
   a locking mechanism which engages said pin and includes:
   an actuator,
   a locking means for engaging said pin when said actuator is de-energized, and
   an unlocking means which is actuated in conjunction with application of power to said desk player for placing said player in playback mode, said unlocking means cooperating with said locking means to hold said pin in engagement with said locking means when said actuator is de-energized wherein said unlocking means comprises an unlocking lever and said locking means comprises a locking lever, and wherein said locking mechanism further comprises a base having said actuator, said locking lever and said unlocking lever mounted thereon, said locking lever and said unlocking lever being pivotally mounted on said base about a pivot shaft.

23. A disk player having a pickup which is driven by a linear motor, comprising:
   a pickup unit having said pickup disposed thereon and a locking pin; and
   a locking mechanism which engages said pin and includes:
   an actuator,
   a locking means for engaging said pin when said actuator is de-energized, an unlocking means which is actuated in conjunction with application of power to said desk player for placing said player in playback mode, said unlocking means cooperating with said locking means to hold said pin in engagement with said locking means when said actuator is de-energized wherein said locking means comprises a first member pivotable amount an axis by said actuator and said unlocking means comprises a second member pivotable about said axis by said locking means.

24. A disk player having a pickup which is driven by a linear motor, comprising:
   a pickup unit having said pickup disposed thereon and a locking pin; and
   a locking mechanism which engages said pin and includes:
   an actuator,
   a link bar coupled to said actuator and having an engaging pin,
   a locking means for engaging said locking pin when said actuator is de-energized, said locking means including a locking lever pivotable about a pin and having a slotted hole disposed therein which is engaged by said engaging pin and spring means for biasing said locking lever in a first direction, said locking lever being pivotable within a range of a clearance of the slotted hole when said actuator is de-energized and
   an unlocking means which is actuated in conjunction with application of power to said disk player for placing said player in playback mode, said unlocking means cooperating with said locking means to hold said locking pin in engagement with said locking means when said actuator is de-energized.

* * * * *